INVENTOR.
BY ALFRED W. MASCHKE
Roland A. Anderson
Attorney

INVENTOR.
ALFRED W. MASCHKE
BY
Roland A. Anderson
Attorney

INVENTOR.
ALFRED W. MASCHKE
BY
Roland A. Anderson
Attorney

INVENTOR.
ALFRED W. MASCHKE
BY 3,386,040

PARTICLE ACCELERATOR INCLUDING MEANS FOR TRANSFERRING PARTICLES BETWEEN ACCELERATOR AND STORAGE RING

Alfred W. Maschke, Rocky Point, N.Y., assignor to the United States of America as represented by the United States Atomic Energy Commission Filed Aug. 5, 1965, Ser. No. 477,625
5 Claims. (Cl. 328—235)

ABSTRACT OF THE DISCLOSURE

Apparatus and method for producing a high energy high intensity charged particle beam in which charged particles are longitudinally compacted by injection into the betatron phase space of a cyclic alternating gradient magnetic particle confining ring. In one embodiment, alternating gradient synchrotron cyclic accelerator and storage rings are provided with provision for the extraction and injection of the particles back and forth therebetween whereby a plurality of relatively low energy large diameter beams that are reduced in diameter by acceleration to an intermediate energy in the accelerating ring can sequentially be extracted from the accelerating ring and sequentially longitudinally compacted in the betatron phase space of the storage ring to produce a high intensity beam that can be extracted from the storage ring and injected into the accelerating ring for acceleration therein to high energies.

This invention relates to method and apparatus for accomplishing the production of high intensity charged particle beams and more particularly to method and apparatus for longitudinally compacting charged particles for the production of high intensity, high energy charged particle beams.

In the field of physics, it has been desirable to produce high energy charged particle beams. Various proposals have been made and used to accomplish such beams including the cyclic accelerator arrangements shown in U.S. Patents 2,736,799, 2,882,396, 3,128,405, 3,139,591, 3,171,-025, 3,089,092, and application S.N. 441,394 filed Mar. 19, 1965, now U.S. Patent 3,343,096, all of which are assigned to the assignee of this invention. While these arrangements have been useful and can accomplish the desired high energy beams, the beams have had low intensities determined by the space charge repulsion limit of the cyclic accelerator at its low injection energy. It has also been advantageous to increase the beam intensity after injection into the cyclic accelerator without increasing the small energy spread of the beam required for acceleration to the energy limit of the cyclic accelerator to provide high beam currents in existing accelerators for the production of large numbers of rare interactions and rare reaction products, such as neutrinos.

It is an object of this invention, therefore, to provide an economical and practical apparatus and method for the production of high intensity charged particle beams by providing longitudinal compaction of conventional cyclic accelerator beams;

It is another object of this invention to provide means for injecting charged particles into an accelerator in such a way as to avoid the space charge limitations of injection at low energy.

It is a further object to provide means for producing an intensity of $2\times10^{13}$ protons or more per accelerated pulse in an existing cyclic accelerator with high reliability, and minimum cost and modification to the accelerator;

It is a further object to provide an improved injection, extraction and stacking system for charged particle beams;

It is a further object to provide a novel bootstrap system for high energy particle accelerators;

It is a further object of this invention to provide an improved system for operating cyclic accelerators to obtain a particle intensity per accelerated pulse of at least an order of magnitude greater than that which is determined by the space charge repulsion limitation of the accelerator at normal injection energies;

It is a further object of this invention to inject particles into a cyclic accelerator, accelerate the particles in separate beams, extract the accelerated beams, stack a plurality of the extracted beams together, and inject the stacked beams into the cyclic accelerator for further acceleration;

It is a further object to provide for the simple and relatively inexpensive high energy high intensity injection of charged particles into a cyclic accelerator;

It is a further object to provide for the increased intensity of charged particle beams after injection into a cyclic accelerator while maintaining low energy spread thereof;

It is a further object to provide a high charged particle beam current for the production of rare interactions and rare reaction products, such as neutrinos;

It is a still further object to provide for the longitudinal compaction of charged particles in the betatron phase space of a strong focused beam.

The foregoing objects are achieved by this invention in a simple and effective method and apparatus that longitudinally compacts charged particle beams from existing apparatus, such as the 33 bev. cyclic accelerator at Brookhaven National Laboratory. The method and construction involved in this invention utilize standard and well known techniques and apparatus and are highly flexible for a wide range of applications, beam energies, intensities and particles. More particularly, this invention involves the extraction of particle bunches from a cyclic ring source and the longitudinal compaction of these bunches in the betatron phase space of another cyclic ring. These cyclic rings are arranged, in one embodiment, in a system that accelerates twelve particle bunches in a first strong focusing cyclic ring in a first energy increment with a high repetition rate, ejects the bunches, rotates the phase space of the bunches, injects the bunches with a high repetition rate into a second cyclic strong focusing ring where the bunches are longitudinally compacted in the betatron phase space thereof with a low energy spread, and re-injects the compacted bunches back into the first cyclic ring for acceleration in a second energy increment. With the proper selection of increments, fields, rotation, and ring sizes, as described in more detail hereinafter, the desired high beam currents are obtained.

Various other objects, novel features and advantages will appear from the following description of four embodiments of this invention, and the novel features will be particularly pointed out hereinafter in connection with the appended claims.

In the drawings where like parts are marked alike:

Figure 5:
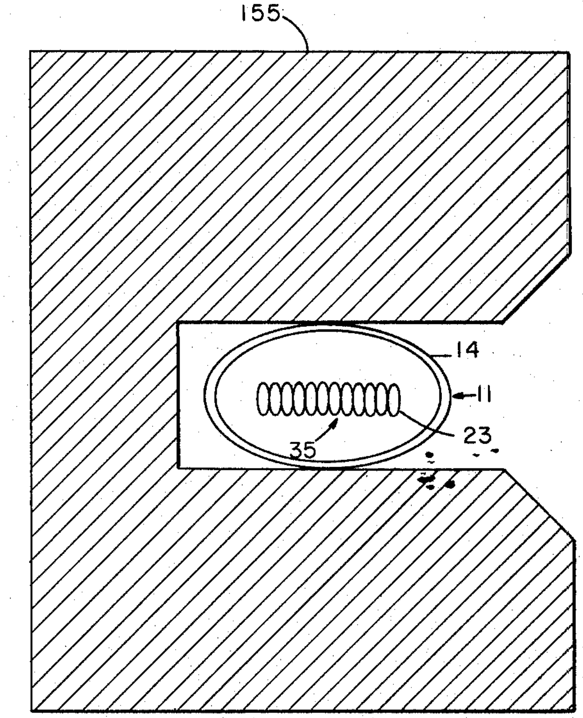
FIG. 5 is the beam of FIG. 4 injected into the cyclic accelerator ring of FIG. 1.

It is known that beams of high energy particles can be confined and transported over long distances in straight, curved and endless or circular lines, orbits or axes and these particles can be injected and extracted at will from these lines, orbits, or axes. One accelerator source for providing such beams of protons at from 50 mev. to 33 bev. along such axes, is shown and discussed in, "The Brookhaven Alternating Gradient Synchrotron" by John P. Blewett, which was printed in the 1960 International Convention Record. FIG. 5 of that paper shows the tubular vacuum chamber in which the beam travels with low scattering from gas molecules. This tube is eliptical in cross-section, about 6 inches wide by 2¾ inches high, and this elipitical shape with a minor vertical ellipse axis and a major horizontal ellipse axis is provided between the magnet poles of focusing and bending magnets to provide the highest possible field in the tube aperture.

Focusing of the beam in the tubes is based on the strong focusing system having magnetic lenses which alternately focus the beam in the vertical and horizontal directions along an equilibrium axis or orbit with a predetermined small betatron oscillation therefrom, the space of said oscillations forming a small betatron phase space so that the beam does not hit the tube wall as the beam travels or is accelerated from one energy to a higher energy. In the Brookhaven 33 bev. cyclic accelerator the wave length of this oscillation is about 300 feet and the betatron frequency is about 1 to 3 megacycles per second from injection at 50 mev. to the full accelerated energy at 33 bev. The betatron phase space cross-sectional area of the beam is about ¾ of the cyclic accelerator tube cross-sectional area at an injection of 50 mev., is half that area at 500 mev. and is about .25 inch wide on the average at 33 bev. In these beams the particles usually travel in bunches, e.g. twelve bunches fifty feet long, having about 220 feet between the bunch centers.

As is well known, the protons in the Brookhaven cyclic accelerator are inflected by suitable magnets with a low energy spread of ±2 milliradians or less at 50 mev. from a linear accelerator connected to the cyclic accelerator between magnetic confining and focusing lenses in the cyclic accelerator, the injected particles are accelerated in bunches with low energy spread by radio frequency accelerator stations between the magnetic confining and focusing lenses of the cyclic accelerator in synchronization with the confining field in the magnetic lenses and the accelerated particles are extracted from between or through these confining and focusing magnets by well known kicker magnets that are suitably energized at the desired energy interval and time. One suitable kicker is described in Brookhaven National Laboratory Report BNL 8662, dated Oct. 27, 1964, by E. B. Forsyth.

This invention hereinafter described utilizes a beam source of the above described type from which a plurality of particle beams of low energy spread are accelerated in a first ring and extracted with a high repetition rate for high intensity stacking in the betatron phase space of a second ring. The particles may then be extracted from the second ring or accelerated further in the second ring to produce high beam currents. As will be understood in more detail hereinafter, the stacking ring can be a cyclic strong focusing beam guide like the accelerator ring or, the stacking ring can be a high momentum pulsed accelerator ring.

Figure 1:
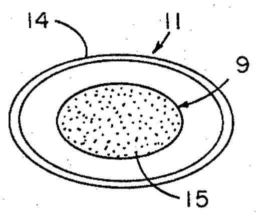
FIG. 1 is a partial cross-section of a cyclic accelerator ring and beam therein at injection.
Figure 2:
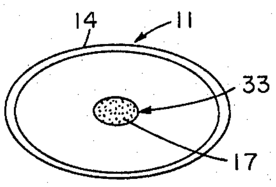
FIG. 2 is the beam of FIG. 1 after acceleration to a first middle energy increment.

In order to explain how the method and apparatus of this invention accomplish the function of compacting the extracted beam from the cyclic accelerator source, reference is made to FIGURES 1 through 5, wherein are illustrated several cross-sections of accelerator and storage rings at given locations at selected times on a normal acceleration cycle. Referring to FIG. 1, the injected beam 9 travels in evacuated beam tube 11 of cyclic accelerator 13 having an elliptical vacuum tube cross-section 14. The beam 9 after injection (e.g. at 50 mev.) also has an elliptical cross-section 15 corresponding in its minor vertical axis and its major horizontal axis with the orientation of the axes of the elliptical tube 11, the beam being centered in the beam tube 11 with a predetermined large first cross-sectional area. After acceleration to 500 mev., the direction and length of the axes of the beam ellipse and the ellipse area i.e. its phase space, have the same orientation but a smaller area 17, as shown in FIG. 2. This shrinkage results from the change in momentum ratio of the beam, which is about 3.5 from 50 mev. to 500 mev. and results in a beam cross sectional area decrease ratio of about 3.5 to 1.85 because the attractive forces in the beam increase by the square of the momentum increase in the beam while the repulsive forces of the beam particles remain constant. This will be understood from the fact that the magnetic attraction of the particle beam currents increases as the square of the velocity increase whereas the particle repulsion of the like charged particles is independent of velocity so that the beam shrinks in cross-section as its speed increases. The betatron oscillation also decreases by the square of this momentum increase.

Figure 3:
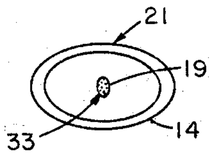
FIG. 3 is the beam of FIG. 2 rotated 90° in phase space.
Figure 4:
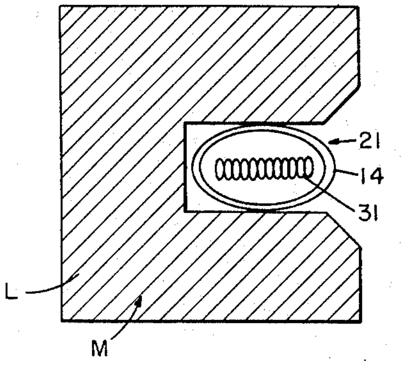
FIG. 4 is a diagrammatic illustration of the beam of FIG. 3 with other beams compacted therewith in accordance with the principles of this invention.

Should each of the particle bunches in the cyclic accelerator be extracted and rotated in phase space 90°, as shown by beam cross-section 19 in FIG. 3, all these particle bunches can be placed side by side in the horizontal betatron phase space provided by an adjacent ring 21 of the same cross-sectional size, shape and relative orientation as the accelerator tube 11. This compaction is shown in FIG. 4. These compacted bunches when thereafter injected into the accelerator tube 11, as shown by cross-sections 23 in FIG. 5, have the same size, shape and orientation as when they were in the ring 21.

Figure 6:
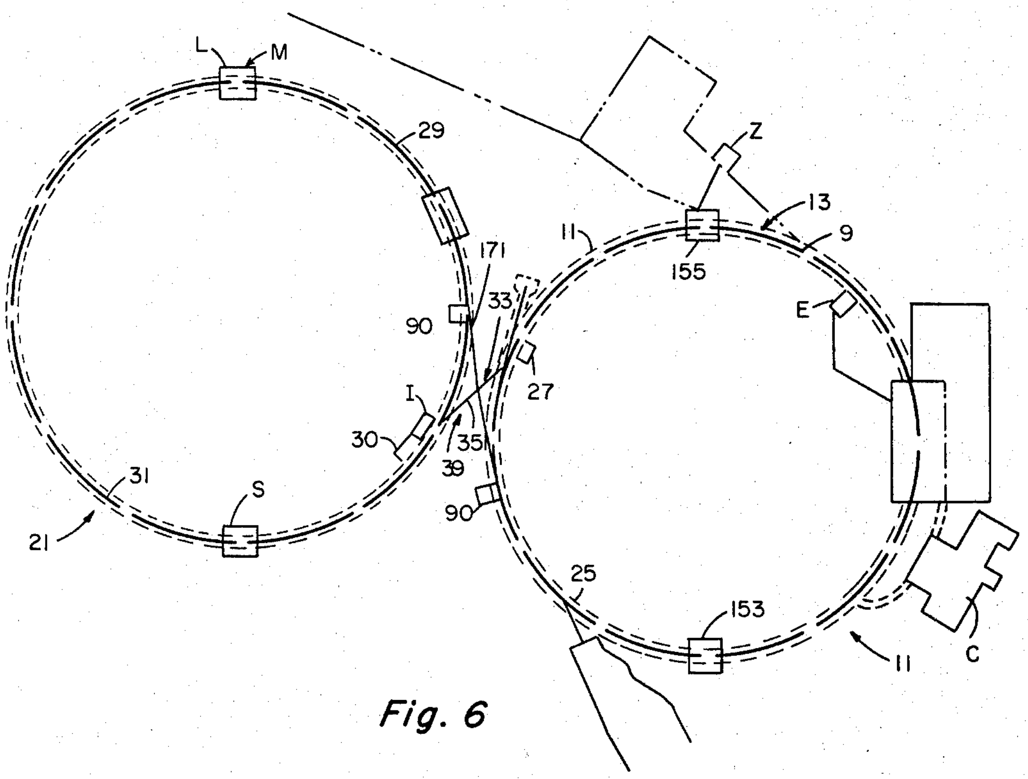
FIG. 6 is a partial top view of cyclic accelerator and stacking rings of this invention.

The beam can be extracted in parts from a large or small diameter annular accelerator tube 11 at relatively low energy, for example at 500 mev. Thus, for example, each of the initial twelve bunches 25 in the cyclic accelerator, provided by the RF accelerating stations therein, are selectively, sequentially extracted by electromagnetic kicker means 27 as shown in FIG. 6. Also, by injecting each extracted bunch 25 into a ring 21 that is different in circumference than the cyclic accelerator tube 11 the bunches 25 that are adjacent in the accelerator ring are easily compacted with each other, in the betatron phase space in the stacking ring to form longitudinally compacted bunches 29 therein. Additionally, a stacking ring 21 that does not accelerate the particles therein, can be a constant field DC ring with small low field magnets and a small containment tunnel, which is relatively cheap to make. A single RF station in a constant field ring 21 maintains bunching in the beam therein to insure a small beam energy spread as in the accelerator 13.

As will be understood in more detail hereinafter, this system provides for the same number of bunches 25 and 29 in the rings 11 and 21 respectively and at least as many compacted bunches 29 as uncompacted bunches 25. To this end, the cyclic accelerator 13 is operated as a high repetition rate injector for injecting bunches into the betatron phase space in the ring 21, this injection taking e.g. about 1 minute, and the ring 21 operates to inject particles into the cyclic accelerator 13 at high energy for acceleration to its peak higher energy e.g. in one more minute.

Figure 7:
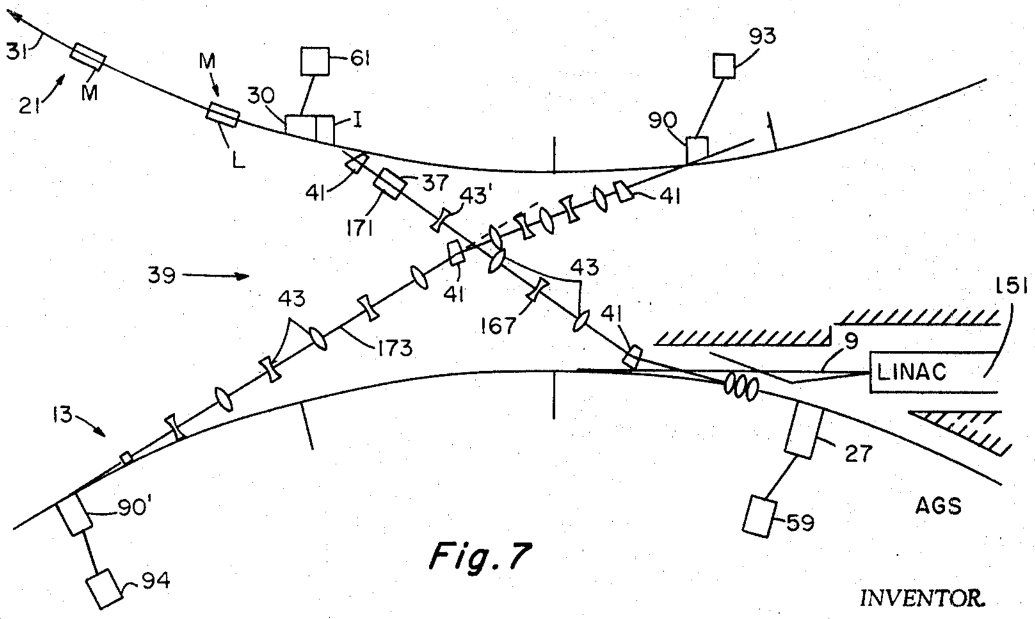
FIG. 7 is a partial top view of the beam transport system between the accelerator and stacking rings of FIG. 6.

A practical arrangement for accomplishing the longitudinal betatron phase space compaction of this invention is illustrated in FIGS. 6 and 7. Shown there is an arrangement of similar rings 11 and 21. However, the ring 21 has, in one embodiment, the unique feature of providing a large circumference ($^{13}/_{12}$ time the accelerator ring) and a relatively low momentum beam (below ~1 bev./C). Thus there is a large ratio of straight sections to magnet length and a small number of magnets, which although the same in design as in the accelerator ring, are much smaller in size, cost and number than in the main accelerator ring. Likewise the magnet tunnel enclosure is smaller. Additionally, the stacking ring is run at constant field and has only a single, fixed frequency, RF cavity for bunching the particles therein.

Twenty C type magnets M, one of which is shown for ease of explanation, each 40″ long are provided in the ring 21 with the same aperture and pole configuration as the present BNL AGS main magnets. The field per magnet required for 1 bev. (twice that required for a 500 mev. stacking ring) is only 2700 gauss or less. As a consequence the back legs L of the magnets M are small, resulting in an overall cross-section twenty-two inches wide by eighteen inches high. A total of twenty normal or superconductor turns per magnet are provided in two pancakes which fit through the magnet pole gap. Each magnet weighs only about two tons and requires only four hundred kilowatts for a constant current of one thousand amperes through the coils. These stacking ring constant currents greatly simplify the magnets since they avoid the eddy current problems of the pulsed accelerator magnets. They also lend themselves easily to the use of superconducting windings, and these may be used as an alternative to the described normal resistance windings.

The vacuum requirements are also not severe at 500 mev. so that conventional sputter ion vacuum pumps with a speed of 500 l./f. easily achieve the desired pressure of $10^{-7}$ torr.

The RF system runs on the 12th harmonic of the revolution frequency in the main ring 11, and since the ring 21 is $^{13}/_{12}$ larger than the accelerator ring 11, one bunch at a time is extracted from the accelerator ring 11 on successive revolutions of the particle bunches therein, and these are all stacked in the same bucket of the stacking ring 21 or approximately $^{1}/_{12}$ of the circumference of the stacking ring 21. This RF station operates on a constant frequency of 3.5 mc./sec. and since only one single cavity is required the power requirements therefor are low.

The controls for the stacking ring are brought back to the accelerator control center C and suitable pick-up electrodes E are provided with or without amplifiers in a cathode follower arrangement, as is well known. Thus monitoring, adjustment and instrumentation are remotely operated in conjunction with the accelerator control C To obtain a maximum stacking in accordance with the principles described above, the method used for filling the phase space in the stacking ring 21 is like the 50 mev. injection into the accelerator ring 11 except that the orbit kicker 27 and inflector 30 are pulsed according to a particular program that avoids deflecting the already filled stacking ring buckets into the inflector. This process is then repeated 12 times, after which the 12 buckets of the stacking ring 21 are ejected from the stacking ring 21 into the accelerator ring 11 in a single turn. Since the beam 31 in the stacking ring 21 is kept bunched in the stacking ring at the 13th harmonic (fixed frequency), the bunch spacing is the same as for the 12th harmonic for 50 mev. beam 9, 500 mev. beam 33 and stacked beam 35 in the accelerator 13 and there are no losses incurred by the necessity of a rebunching process when the stacked beam 35 is accelerated in accelerator 13. Also, there is a factor of 12 increase in the intensity of stacked accelerator beam 35 per accelerated pulse over the 50 mev. unstacked accelerator beam 9 or 500 mev. beam 33, and beam 35 is at the space charge repulsion limit of accelerator 13 at the 500 mev. energy.

The flexibility of this system will be apparent since the 500 mev. proton beam 31 in the stacking ring 21 gives a factor of 3.5 decrease over the phase space at injection into the accelerator beam 9 at 50 mev. Therefore, by filling the accelerator 13 at 50 mev. injection there is a 5 mrad inch vertical and 14 mrad inch horizontal phase space occupied by the unstacked beam 9 therein and after acceleration to 500 mev. the horizontal phase space in the unstacked beam 33 has shrunk enough (about half in size) to fit into the vertical aperture.

Figure 15:
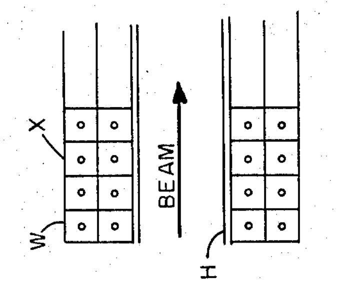
FIG. 15 is a partial cross-section of a solenoidal device for rotating 90° the phase space of the beam of FIG. 2.

As shown in FIG. 7, means 37 in the transport system 39 between the accelerator 13 and the stacking ring 21 rotates the phase space of beam 33 extracted from the accelerator 13. A conventional solenoid may be used to this end to exchange the horizontal for the vertical phase. As shown in FIG. 15 this solenoid comprises two layers of rectangular cross-section windings W around a center four inch hole H. This solenoid in this embodiment is 15 feet long and is energized from a suitable source (not shown) with about 200 kilowatts to produce a field of 10 kilogauss. The holes in the windings carry circulating cooling water. Conventional bending magnets 41 and strong focussing quadrupole magnets 43 bend and strong focus the beam transported in transport system 39.

If only about 60% of the available vertical phase space of the accelerator 13 is used, this allows 16.7 turns thereof in the horizontal aperture of the stacking ring 21. It is thus modest to put 12 accelerator turns into the stacking ring 21 with high efficiency.

The cycling speed with which the compacting and reinjection operation proceeds is determined by the maximum rise rate of the magnetic fields, and the available RF voltage for acceleration in accelerator 13. With a suitable motor generator set the magnetic field is brought from the 50 mev. to the 500 mev. level in about 10 milliseconds. This limit is set by the generator voltage and coil insulation. Since the RF system is capable of this rate of rise it is possible to cycle at 50 c.p.s. However, by reducing this rise time for improved capture the rise time is 20 msec. and the field is still returned in 10 msec., resulting in a 33 c.p.s. rate. The repetition rate is thus increased by between 180 and 360 milliseconds but some of this time may be recovered by operation during the dwell time of the m.-g. set.

The saw tooth magnet supply $z$ for the accelerator 13 is conventional. In this regard this is provided by phasing two suitable power supplies to provide 3 kv. during rectification and 6 kv. during invert. The cycle then is correct and the large ripple is filtered to linearize the saw tooth during the rectification. To this end an air core inductor of 15–20 millihenries, capable of carrying the main magnet current is used to provide series impedance across the ripple correction voltage and the conventional ripple filter is used for ripple correction during the flat-top operation.

Figure 8:
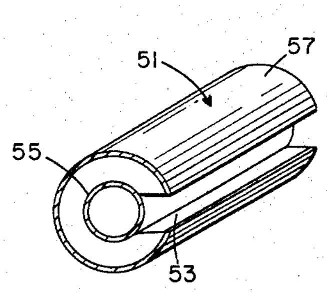
FIG. 8 is a partial three dimensional view of the electromagnetic kicker and inflector for the accelerator and stacking rings of FIG. 6.

The magnets for ejector 27 for accelerator 13 and for inflector 30 for stacking ring 21 are shown in FIG. 8. These magnets comprise a single turn ferrite magnet 51 having a deflecting force of about 250 gauss-meters with a current of 500 amperes. The respective beams are located at the center of slot 53 and are deflected sideways by flowing current down the inner conductor 55 and back along the outer conductor 57.

Pulsing the power supplies for these magnets is required to eject the beams from the accelerator 13 and to inflect them into stacking ring 21. To this end the ejector 27 for the accelerator and the inflector 30 for the stacking ring, comprise, separate, like, programmed hard vacuum tube pulsers 59 and 61 for a kicker magnet 51 and a like inflector magnet 51. The pulses for both magnets are synchronous but whereas the pulse amplitudes for the kicker 27 are uniform the pulse amplitudes for the inflector 30 are decreasing in each inflection cycle. The rise and fall time provided is 100 nanoseconds. Up to twelve such pulses are produced in the magnets within a few microseconds, the actual form of this train depending on the pre-set program. To this end a capacitor discharge is provided with thyratron delay lines and vacuum tubes triode modulators in a "floating deck" system.

Figures 9, 10:
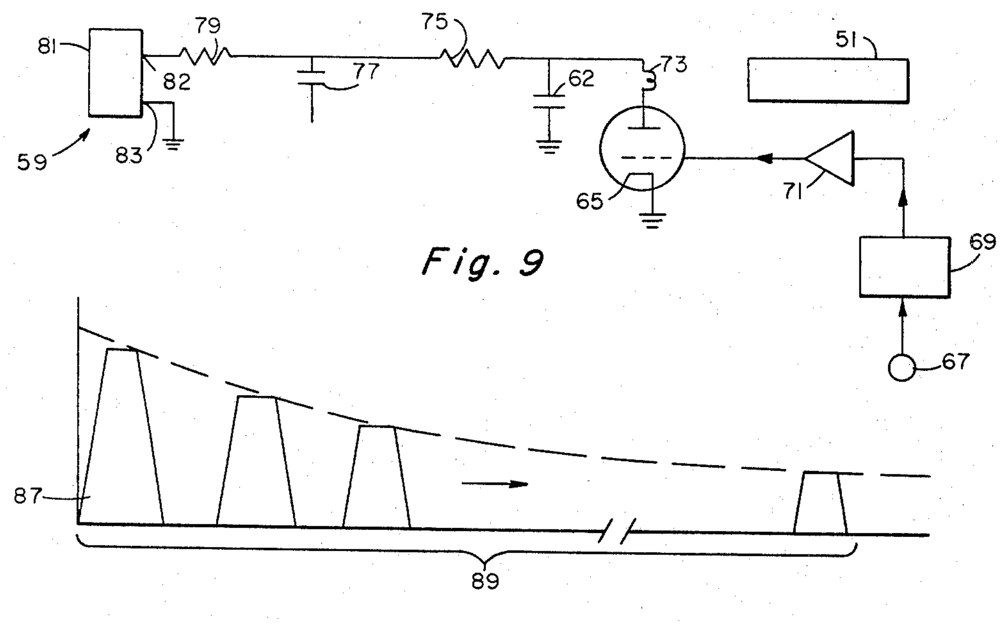
FIG. 9 is a partial schematic illustration of the circuit for the electromagnetic kicker and inflector of FIG. 8.
FIG. 10 is a diagrammatic illustration of one operating sequence of the inflector apparatus of FIG. 9.

A simplified schematic of both of these pulsing systems 59 and 61 is the circuit shown in FIG. 9. A 6000 pf. capacitor 62 resonates with the inductive magnet load 51 to produce an optimum rise time for the particular hard tube driver chosen. In one advantageous embodiment a WL 8461 grounded cathode tube 65 is used. A suitable turn-on trigger 67, program generator 69 and video-amplifier 71 are connected to the grid of this tube and the plate thereof is connected to a 6 $\mu$h. coil 73, grounded capacitor 62, a 50Ω resistor 75, a 4 mf. main energy storage capacitor 77, a 7 kΩ resistor 79 and source 81 having a 55 kv. DC positive terminal 82 and 1 kw. negative (ground) terminal 83. The required characteristics are an output impedance of about 100 ohms and peak cathode current capabilities of 500 amperes. The band width of this system is about 4 megacycles/second.

A typical program for the inflection into stacking ring 21 is shown in FIG. 10. In this program the pulses 87 for inflector 30 are programmed to decrease sequentially slightly in amplitude in each cycle 89 as shown, so that the bunches inflected later into the stacking ring beam 31 in a given cycle 89 do not hit the inflector 30.

Figure 11:
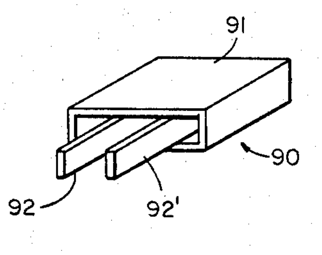
FIG. 11 is a partial three-dimensional view of the ejector kicker and the injector inflector for the stacking and accelerator rings of FIG. 6.

The magnets for ejection from the stacking ring 21 and inflection into the accelerator ring 11 are shown in FIG. 11 and are referred to hereinafter as lumped magnets 90 and 90'. They comprise hollow rectangular ferrite bricks 91 having parallel conductors 92 and 92' therein. The rise time required therefor is about 300 nanoseconds, which is larger than the present accelerator fast kicker ejector in the BNL AGS accelerator, and so this kicker is comfortably used for this respective ejection from the stacking ring 21 and inflection into the accelerator 13.

Figure 12:
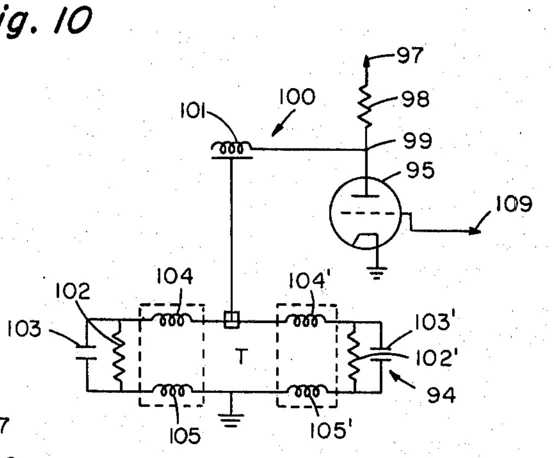
FIG. 12 is a partial schematic drawing of the circuit for the ejector kicker of FIG. 11.

The pulsed power supply for the lumped magnets 90 and 90' comprises hydrogen thyratron magnet pulsers 93 and 94. The pulsing system 93 for the magnet 90 for ejection from the stacking ring 21 is shown in FIG. 12. Here, a grounded cathode 7890 thyratron 95 is advantageously employed. A suitable programmed trigger 96 synchronized with the described program energizes the tube grid and the tube plate is connected to a positive 40 kv. source 97 through a 250 kΩ resistor 98 connected to junction 99. This junction 99 in turn connects to a 4Ω pulse forming network 100 having a transformer 101 connected in parallel to two of the lumped kicker magnets 90 having 8Ω resistors 102 and capacitors 103 connected between their respective windings 104 and 105 and 104' and 105'.

Figure 13:
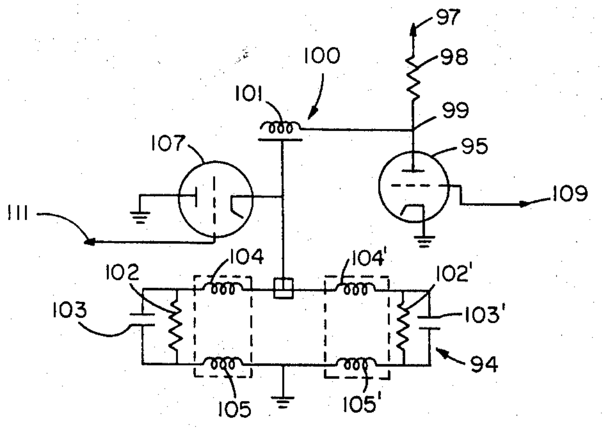
FIG. 13 is a partial schematic drawing of the circuit for achieving fast fall time in the inflector injector magnet field of the inflector apparatus of FIG. 11.

Since the field of the lumped inflector magnet 90' for the inflection into the accelerator 13 must have a fast fall-time the lumped magnet pulser 94 is modified only as shown in FIG. 13. There is an addition of another thyratron 107, such as the described 7890 thydratron. Also, this circuit for inflection into the accelerator 13 has a programmed rise trigger source 109 and a like programmed fall trigger source 111, both of which are synchronized with the above-described programs.

In the operation of a cycle in which a high intensity, high energy accelerator beam 35 is produced, linac 151 injects particles into accelerator tube 11 up to the space charge limit of the accelerator at the injection energy, e.g. 50 mev. The program of accelerator 13 coordinates this injection with the radio-frequency accelerating stations 153 thereof, one of which is shown for ease of explanation in FIG. 6, to produce increasing magnetic focusing and bending fields that receive the injected particles in a 50 mev. beam 9. There results an acceleration of the injected particles to 500 mev. in a beam 33 with a high repetition rate. This repetition rate is such, for example, to provide 12 bunches for each of 12 buckets in stacking ring 21. Thus accelerator 13 provides 144 bunches for 12 buckets in stacking ring 21 and with the proper phase space rotation these 144 bunches longitudinally compact in the horizontal betatron phase space of the stacking ring 21 with a low energy spread so that 12 compacted bunches are injected from the stacking ring 21 into the accelerator 13 in one turn.

The pulser 59 initiates this compaction in a first cycle calling for the energization of kicker 27 in accelerator 13 to eject one 500 mev. particle bunch at a time from a first 12 bunch beam 33 in accelerator 13. The pulser program then inactivates the kicker 27 while the accelerator program produces another or second 500 mev. 12 bunch particle beam 33 in the accelerator 13. The pulser 59 again activates the kicker 27 to eject each of these 12 bunches sequentially and this pulser sub-cycle is repeated until it ejects 144 bunches into beam transport system 39, whereupon the pulser program inactivates the kicker 27 for the one turn injection of 12 compacted bunches from stacking ring 21 and the acceleration of the compacted bunches in accelerator 13, the pulser 59 then being again ready for the repetition of the described first cycles. In each of these cycles pulser 59 produces uniform amplitude pulses in synchronization with the pulses for inflector 30.

Figure 14:
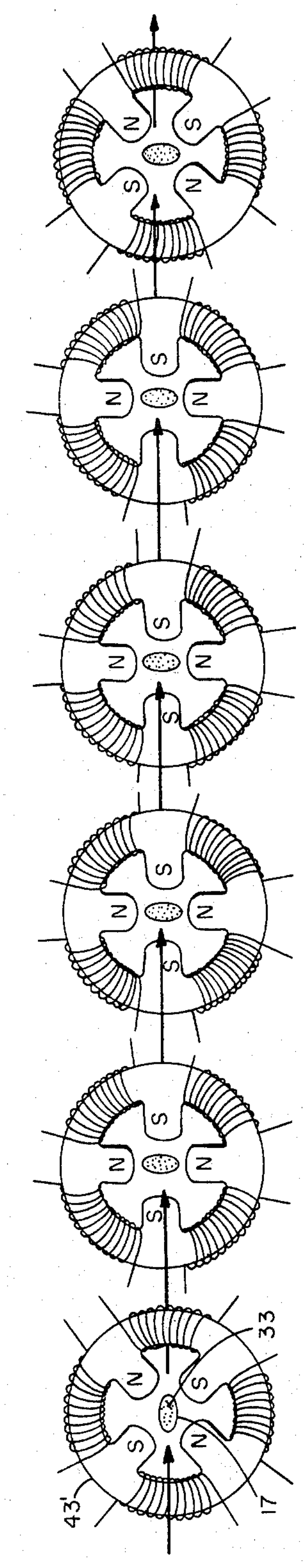
FIG. 14 is a partial three-dimensional view of quadrupole 90° rotation and transport magnets for the beam of FIG. 2.

The transport system 39 transports the particles in the bunches ejected from accelerator 13 and rotates the phase space thereof 90° in a suitable vacuum tube 171 connected to rings 11 and 21. To this end bending magnets 41 suitably bend the particle paths in the ejected beam 33, focusing quadrupole magnets 43 strong focus the particles, and phase space rotating means 37 rotates the beam phase space 90°. One suitable phase space rotator is the solenoid X shown in FIG. 15 for converting the major horizontal ellipse phase space axis to a major vertical ellipse phase space axis. This solenoid X is constructed in three five-foot sections to give a required fifteen-foot over-all length. It has two co-axial water cooled coils W, using stacking ring magnet cooling water, and it is pulsed on and off to utilize the four-to-one stacking ring duty factor in reducing average dissipation. The power required therefor is about two hundred kilowatts. Another suitable rotator 37, however, is shown in FIG. 14. In this system conventional upstream focusing beam transport quadrupoles 43 transport the beam to four like quadrupoles Q rotated 45° from the last quadrupole 43 before the first quadrupole Q. These four quadrupoles Q are then followed by at least one conventional beam transport quadrupole like quadrupole 43 in configuration and orientation.

The location of the stacking ring relative to the accelerator 13 advantageously provides an L–10 ejection location and an A–20 location for the 500 mev. beam 33 injection as understood from the BNL AGS. The beam transport line 171 is about 300 feet long and the distribution of the beam transport elements along this line corresponds with the following parameters: Linac emittance $1.5\pi\ 10^{-3}$ cm.-rad at 50 ma.;

$$W=4'' \text{ mrad}-W_{\text{vert.}}=1.45'' \text{ mrad}$$

at 500 mev. With the described solenoid the result is: $W_{\text{hor.}}=1.45''$ mrad—$W_{\text{vert.}}=4''$ mrad at 500 mev. The energy spread at 500 mev. is about ±0.3 to ±0.4%. The emittance of the beam in the transport system 39 is determined by the maximum accelerator acceptance, i.e. $W_{\text{hor.}}=14''$ mrad—$W_{\text{vert.}}=4.5''$ mrad. Here also the beam energy spread is of a similar low magnitude.

Because of the dispersive properties of the required bending magnets 41 the beam transport system 39 combines two bending magnets 41 plus five quadrupole magnets 43 forming an achromatic beam transport section in both transport line 171 into stacking ring 21 and line 173 out of stacking ring 21. An additional 200 feet of straight beam transport is provided in the re-injector line 173, however, and this has a simple infinite transport undispersed section. The quadrupole elements 43 in the re-injection line, as compared with the accelerator ejector line, are closer because of the larger transverse phase space emittance of the beam. Several extra quadrupoles 43 are thus provided in this line.

Both transport systems 171 and 173 have the following bending components: 2 bending magnets 41 having a bending angle of ≅20° and two bending magnets 41 having a bending angle of ≅10°. These magnets 41 have 4″ gaps approximately 4′ along the beam particle axes and a maximum field up to 10 kilogauss. Vertical focusing is provided by vertical focusing wedge angles or strong focusing quadrupoles 43. To this end 20 quadrupole magnets 43 are required having 4″ apertures, 12″ pole lengths and up to 500 gauss/cm. gradients. These are like the 12″ quadrupoles presently used in the 50 mev. linac for the BNL AGS.

Figure 16:
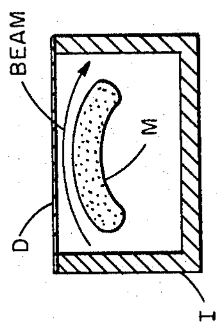
FIG. 16 is a partial cross-section of the electrostatic inflector for the stacking ring of FIG. 6.
Figure 17:
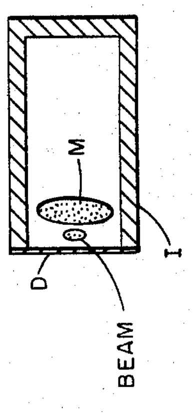
FIG. 17 is a partial cross-section of the inflector of FIG. 16.

The stacking ring inflector 30 receives beam 33 with its phase space rotated 90° and injects each bunch therein into the proper stacking ring bucket. The system used is basically similar to the present BNL AGS multi-turn injector in that a thin plate electrostatic inflector I having a thin grounded plate P and a curved electrode T, as shown in FIGS. 16 and 17, having a high 40 kilovolts (cm.) voltage direct current power supply bends the beam about 1° for inflection into the stacking ring. Spaced one-quarter betatron wave length upstream and down stream from this plate are hard tube pulsers identical to the pulser used to eject the 500 mev. beam from the AGS. To this end, a separate pulser 61 like pulser 59 is provided for inflector 30, programmed to produce pulses 87 in synchronization with the uniform pulses of pulser 59 but the wave form on the grids produces pulses with decreasing amplitudes, so that the deflecting force decreases linearly as successive bunches are stacked whereby none of the sequentially injected bunches hit the inflector 30. Also, the first bunch injected into stacking ring 21, in each first cycle, travels all the way around ring 21 and back to the inflector 30 whereupon the next bunch inflected into ring 21, the bunch that was behind the first bunch in accelerator 13, longitudinally compacts into the betatron phase space of this first bunch in ring 21. This produces a longitudinal compaction of the twelve bunches in the accelerator 13 in this first cycle into one bucket in the stacking ring 21. Thereupon this first cycle is repeated after appropriate first repeated accelerator intervals (i.e. acceleration from 50 to 500 mev. 12 times) to fill the rest of the buckets in the stacking ring 21, while the RF station S in ring 21 holds the proper distance between the bunches thereby substantially to hold the same low energy spread as held by the RF bunches in accelerator 13.

The 500 mev. circulating stacked beam 31 is ejected from ring 21 in one turn in a suitable program. However, the requirements for this kicker are not severe and it is only pulsed<about once every second. Therefore, an exact copy of the existing BNL AGS fast kicker is used but with a lower deflecting force and only one hydrogen thyratron. The pulser 93 energizes kicker 90 on stacking ring 21 according to this program to eject in one turn the 12 bunches compacted in ring 21 into beam transport system 173 which like transport system 171 has bending magnets 41 and strong focusing quadrupole magnets 43 for transporting the beam 31 and suitable vacuum connections between vacuum tubes 11 and 21.

The magnet inflector 90′ for the accelerator is similar to the existing AGS fast kicker. Comparable field and pulse duration are required. However, the field must collapse in about 100 nanoseconds after the 12th bunch has entered the accelerator. To this end pulser 94 energizes the lumped magnet inflector 90′ on accelerator ring 11 to inflect the particle bunches in beam 31 into the accelerator 13 at the space charge limit of this 500 mev. injection particle energy after which the current flow abruptly stops. A conventional means, such as a tail-biter or switch may be used to this end. Thereupon the accelerator program increases the RF and magnetic fields provided therein in synchronization to accelerate the beam 35 to the desired second accelerated energy level. The beam 35, for example, can thus be carried to 33 bev. for the ejection of beam 35 as is conventional and the beginning further cycles as described above. To this end the RF accelerating system provides 200 kev. energy gain/turn, 3.5–4.5 mc./sec. in contrast to the 100 kev. energy gain/turn, 1.4–4.5 mc./sec. for the first energy acceleration increment in beam 33.

In the acceleration to 33 bev. RF ferrite accelerator rings 153 are used having conventional air gaps and an unsaturated permeability of 200–250, whereas their normal value is 400. To this end rings with outer diameters of 45–50 cm. are concentrically placed about the existing, or an equivalent to the existing, BNL AGS system of Ferroxcube 4H. The final power density in these modes is .25 to .30 watt/(cm.)³. For the second high energy, mode in beam 35 the cavity is biased from 900 to 1400 amperes in contrast to 0 to 900 amperes in the first low energy mode in beam 33.

The parameters for the described example of the stacking ring of this invention are as follows:

| | |
|---|---|
| Stacking energy ____ mev. | 500 |
| Orbit radius ____ ft. | 466.57 |
| Number of betatron wavelengths per orbit circumference | 8.75 |
| Number of magnets per focusing (or defocusing sector) | 1 |
| Number of magnets per period | 2 |
| Number of periods | 60 |
| Number of magnets per super period | 10 |
| Total number of magnets | 120 |
| Number of RF cavities | 1 |
| Cavity frequency (fixed) ____ megacycles/sec. | 3.5 |
| Magnet pole width ____ inches | 12½ |

In another embodiment, the elliptical cross-section of the stacking ring vacuum tube and its magnets are arranged at an angle of 90° relative to the elliptical tube cross-section of the described accelertor arrangement. This eliminates the need for rotating the beam phase space 90° between the accelerator ring and the stacking ring.

In another embodiment the injection turns are varied. Thus, for example, a 6-turn injection into two successive buckets in the stacking ring are performed, instead of inserting 12 bunches into a single bucket in the stacking ring. Therefore, one gains a factor of 6 in the intensity per accelerated pulse. Accordingly, a $2\times10^{12}$ particles/cm.² accelerator pulse is increased to $1.2\times10^{13}$ particles/cm.² whereas a 12 bunch compaction per stacking bucket produces $2.4\times10^{13}$ protons per pulse.

In another embodiment the extraction energy of beam 33 can be raised and/or the number of increments of acceleration can be increased by suitable adjustments to the accelerator and stacking ring programs, and/or by suitably adjusting the fields in the stacking ring to provide still higher beam currents. To this end a larger stacking ring magnet aperture is provided since the stored energy goes up as the square of the magnetic aperture.

In still another embodiment the injector ring may be smaller than the accelerator ring.

Since the particle axes lengths determine how much charge can be put therein, the stacking ring of this invention provides large injection currents. It is noted in this regard that the cost of increasing the tunnel and magnet lengths is linear, whereas the cost of increasing the size of the magnetic aperture goes up as the square of the increased aperture size. Also, since the acceleration to high energy, e.g. from 500 mev. to 33 bev. takes much more time than acceleration from 50 mev. to 500 mev., the accelerator can be operated as a high repetition rate injector for the stacking ring, providing e.g. $9 \times 10^{13}$ protrons/sec. at 500 mev. In this regard acceleration from 50 mev. to 500 mev. takes about $\sim .02$ sec., the magnetic field is brought down in $\sim .01$ sec. and this is repeated 30 times/sec. to provide a 30 bev. beam particle repetition rate of $\sim 2$ sec. Also, it takes 3.5 turns to inject 50 mev. particles whereas 500 mev. injection would take 12 turns.

This invention provides a simple and economic system for producing very high charged particle beam currents. Moreover, the system of this invention employs conventional equipment to achieve higher charged particle beam currents than were possible heretofore, up to at least a factor increase. This system also overcomes the space charge limitation of existing low energy injection. Additionally, it provides an improved beam extraction, phase space rotation, and injection system that produces longitudinal particle compaction in the betatron phase space of a cyclic beam guide. This system also provides a bootstrap injection system with low particle energy spreads for incremental acceleration of charged particles to high beam currents and the injection of particles into accelerators at high injection energies whereby the particles are injected at the space charge repulsion limit of each acceleration increment.

What is claimed is:

1. Particle stacking apparatus for use with a source of highly energized charged particles having a low energy spread, comprising means consisting of a cyclic accelerator ring for accelerating said particles from said source in bunches having a low energy spread, alternating gradient cyclic charged particle guide means having a system of magnetic lenses for receiving and focusing said particles in a circulating beam having a betatron phase space in said lenses along a particle equilibrium axis traversing spaces between said lenses, means for extracting said bunches from said accelerator ring, means for rotating the phase space of the extracted bunches, and means for injecting the bunches whose phase space has been rotated into at least one of said spaces between said lenses in said betatron phase space for longitudinally compacting said bunches into a high intensity beam.

2. The invention of claim 1 having a linear accelerator source and inflector magnets for sequentially injecting a plurality of beams into said accelerator ring for multiturn injection of said plurality of beams from said accelerator ring into the betatron phase space of said magnetic lenses.

3. The invention of claim 1 in which said means for rotating the phase space of the extracted bunches is a solenoid that rotates the phase space 90°.

4. The invention of claim 1 having magnetic kicker means for extracting said particle bunches from said accelerator ring and said guide means, and magnetic inflector means for said accelerator ring and said guide means for injecting said particle bunches therein for providing a plurality of longitudinally compacted particle bunches having a low energy spread in said betatron phase space and for injecting said compacted bunches into said accelerator ring for further acceleration therein.

5. Particle stacking apparatus for use with a source of highly energized particles having a low energy spread, comprising a cyclic accelerator ring for accelerating said particles from said source in bunches having a low energy spread, alternating gradient synchrotron cyclic particle guide means having constant field direct current bending and focusing magnets forming a stacking ring 13/12 the circumference of said cyclic accelerator ring for receiving said particle bunches from said accelerator ring and circulating them in a betatron phase space with a low energy spread, said synchrotron means having a radiofrequency buncher for producing at least the same number of particle bunches in said synchrotron means as in said accelerator ring, means for extracting said bunches from said accelerator ring and injecting them into said synchrotron means with their phase space rotated 90° for longitudinally compacting said particles therein with a low energy spread, and means for extracting said compacted particles and injecting them into said accelerator ring for accelerating said particles to high energies therein for producing high beam currents therewith.

References Cited

UNITED STATES PATENTS

| | | | |
|---|---|---|---|
| 3,344,357 | 9/1967 | Blewett | 313—62 X |
| 2,829,249 | 4/1958 | Kratz | 328—235 |
| 3,089,092 | 5/1963 | Plotkin et al. | 328—155 |

ROBERT SEGAL, *Primary Examiner.*